(12) United States Patent
Ardhanari et al.

(10) Patent No.: US 8,572,449 B1
(45) Date of Patent: Oct. 29, 2013

(54) INTEGRATED FUNCTIONAL TESTING MECHANISM FOR INTEGRATED CIRCUITS

(75) Inventors: Sivakumar Ardhanari, Chennai (IN); Vardhamana G Hegde, Chennai (IN); Madhanagopalan Sambath Kumar, Chennai (IN); Balakuteswar V Voleti, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 12/972,757

(22) Filed: Dec. 20, 2010

(51) Int. Cl.
*G01R 31/28* (2006.01)
(52) U.S. Cl.
USPC .............................. 714/734; 714/736; 714/30
(58) Field of Classification Search
USPC ........................................ 714/734, 736, 30
See application file for complete search history.

(56) References Cited

U.S. PATENT DOCUMENTS

| | | | | |
|---|---|---|---|---|
| 5,249,281 A * | 9/1993 | Fuccio et al. | ................. | 711/123 |
| 5,956,477 A * | 9/1999 | Ranson et al. | ................. | 714/30 |
| 6,003,142 A * | 12/1999 | Mori | ................. | 714/30 |
| 6,032,270 A * | 2/2000 | Furukawa et al. | ................. | 714/49 |
| 6,185,703 B1 * | 2/2001 | Guddat et al. | ................. | 714/718 |
| 6,249,889 B1 * | 6/2001 | Rajsuman et al. | ................. | 714/718 |
| 7,340,564 B2 * | 3/2008 | Twomey | ................. | 711/125 |

* cited by examiner

*Primary Examiner* — Philip Guyton
(74) *Attorney, Agent, or Firm* — DeLizio Gilliam, PLLC (57) ABSTRACT

An on-chip testing unit can be implemented in an integrated circuit (e.g., a SoC) to validate the operation of cache memories associated with a processor of the integrated circuit. For each testing instruction to be executed by the processor for testing a cache memory, the testing unit can intercept information (e.g., address, data, and/or control signals) generated by the processor in response to executing the instruction. The testing unit can determine whether information generated by the processor matches corresponding expected information associated with the instruction. This can enable the testing unit to determine whether the processor can correctly identify an address from which the next instruction is to be fetched, can ensure consistency between data in the cache memories and persistent storage devices, and whether the processor is operating as expected. An error notification can be generated if the information generated by the processor does not match the expected information.

27 Claims, 6 Drawing Sheets

INTEGRATED FUNCTIONAL TESTING MECHANISM FOR INTEGRATED CIRCUITS

BACKGROUND

Embodiments of the inventive subject matter generally relate to the field of hardware testing and, more particularly, to an integrated functional testing mechanism for integrated circuits.

To ensure the validity of the operations of various components (e.g., cache memories, communication interfaces, etc.) of a system on a chip (SoC), streams of binary signals at nodes that are to be tested ("test nodes") can be characterized during test periods. For example, changes in binary logic levels of data signals at a test node may be counted during a test period and may be compared to an expected number of data transitions for the same test node. As another example, signature analysis can be implemented on the SoC. Using signature analysis, a data word that is indicative of a digital signal generated at a test node of the SoC during a test period can be determined. The data word generated at the test node can be compared against expected data words associated with the test node to determine the presence of errors in the SoC.

SUMMARY

Various embodiments of a functional testing mechanism for integrated circuits are disclosed. In one embodiment, it is determined, at a testing unit of the integrated circuit, to test a cache memory associated with a processor of the integrated circuit. A plurality of instructions to be executed by the processor for testing the cache memory associated with the processor is determined at the testing unit. For each of the plurality of instructions to be executed by the processor for testing the cache memory associated with the processor, information associated with the instruction is received from the processor. The information is generated by the processor in response to executing the instruction. It is determined, at the testing unit, whether the information generated by the processor in response to executing the instruction matches expected information associated with the instruction. An indication of a next of the plurality of instructions is provided from the testing unit for execution by the processor in response to determining that the information generated by the processor in response to executing the instruction matches expected information associated with the instruction. An error notification is generated in response to determining that the information generated by the processor in response to executing the instruction does not match the expected information associated with the instruction.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to testing operational validity of an Ethernet communication interface, it is noted that techniques described herein for testing the operational validity can be extended to various other communication interfaces such as universal asynchronous receiver/transmitter (UART) interfaces, subscriber line interface circuits (SLIC) interfaces, inter-IC sound (I2S) interfaces, serial advanced technology attachment (SATA) interfaces, etc. In other instances, well-known instruction instances, protocols, structures, and techniques have not been shown in detail in order not to obfuscate the description.

A system-on-a-chip (SoC) typically comprises multiple components including a processor, communication interfaces, cache memories, etc. To ensure quality of the SoC and to ensure that the operation of the SoC is error free, the components of the SoC can be subject to a set of functional tests. For example, memory built-in self-test (MBIST) algorithms can be employed for testing memory units associated with the SoC. However, the MBIST algorithms typically cannot validate operation of the cache memories or the communication interfaces. In some test scenarios, validating the cache memories can require the use of external memory interfaces. For example, functional tests for validating the cache memories can comprise instructions for determining whether requisite data is available in a cache memory, accessing external memory units to retrieve the data if the data is not available in the cache memory, etc. Moreover, existing testing units typically provide one or more predetermined inputs to each component of the SoC to be validated. The existing testing units compare the outputs generated by the components of the SoC against pre-determined expected outputs to determine whether the component passes (i.e., generates the expected output) or fails (i.e., does not generate the expected output) the functional tests. However, the processor and the external memory units may operate at a very high frequency (e.g., 600 MHz). Therefore, the functional tests may be run at speed to ensure that the SoC will operate properly when deployed in a non-testing environment. Expensive, high frequency testing units that run at the high frequency (i.e., at 600 MHz) may be required to validate the cache memories at speed.

Furthermore, as part of validating a communication interface (e.g., an Ethernet interface) associated with the SoC, a packet (comprising test data) can be transmitted via the communication interface (and a loopback circuit) and the received packet can be analyzed for data integrity. The test data can be retrieved from a storage device and can be validated at a memory interface. However, the memory interface and the communication interface could operate at different clock speeds. For example, the memory interface may operate at a clock speed of 600 MHz while the Ethernet interface could operate at a clock speed of 25 MHz (or 125 MHz). Because the memory interface and the communication interface operate at different clock speeds and the clocks associated with the memory interface and the communication interface are asynchronous to each other, determining when to feed an input signal and similarly determining when to sample and compare an output signal can be difficult. In other words, when a signal generated from one clock is sampled with another asynchronous clock, determining the exact capture edge at which the output signal is to be sampled may not be easily determined (e.g., because of varying clock latencies). Thus, testing data integrity to validate the operation of the communication interface may be a complicated, memory-intensive and time-intensive process, which can increase the cost of the SoC.

In some embodiments, an on-chip testing unit can be incorporated on the SoC to reduce the time needed to validate the cache memories at speed for embedded processors on the SoC. The on-chip testing unit can cause the processor to execute each instruction of a cache memory testing algorithm. For each instruction of the cache memory testing algorithm, the processor can determine a corresponding address, data, and/or control signals. In an instruction cache (I-cache) and a data cache (D-cache), the determined address may be indicative of a location from which a next instruction to be executed by the processor is to be fetched. The determined data may be indicative of a dirtied data entry of the D-cache that is to be flushed from the D-cache to a storage device. The on-chip testing unit can compare the determined address with a corresponding expected address and/or can compare the determined data with a corresponding expected data to establish whether the processor and its cache memories are operating as expected. In other words, the on-chip testing unit can determine whether the processor can correctly identify the address from which the next instruction is to be fetched, whether the processor can generate appropriate write-back requests to flush dirty data from the D-cache, whether the processor can ensure consistency between the data in the D-cache and the data in the storage devices, etc. Such an approach for testing the validity of the cache memories can result in activation of more realistic domain crossing signal paths and can improve functional testing of the SoC. This can improve correlation between the SoC and the test environment across various parameters (e.g., voltage, temperature, etc.) of the SoC. Furthermore, executing operations for testing the cache memories on the SoC itself (i.e., implementing the on-chip testing unit) can preclude the need for external memories and expensive dedicated high-speed testers. This can automate the process of testing the cache memories, reduce time spent in testing the cache memories, and improve the efficiency associated with testing the cache memories.

Furthermore, CRC engines can be incorporated in the memory controller and at various communication interfaces (e.g., the Ethernet interface) and communication interface controllers (e.g., an Ethernet controller) to test the integrity of the communication interfaces and their interactions with the memory controller. Using the CRC engines for testing the validity of the communication interfaces can preclude the need for executing functional tests at speed in the presence of asynchronous clocks. The CRC engines could also enable multiple communication interfaces to be validated irrespective of the functionality of the communication interfaces. For example, the same CRC engines could test the validity of the Ethernet interface and also a SATA interface.

Figure 1:
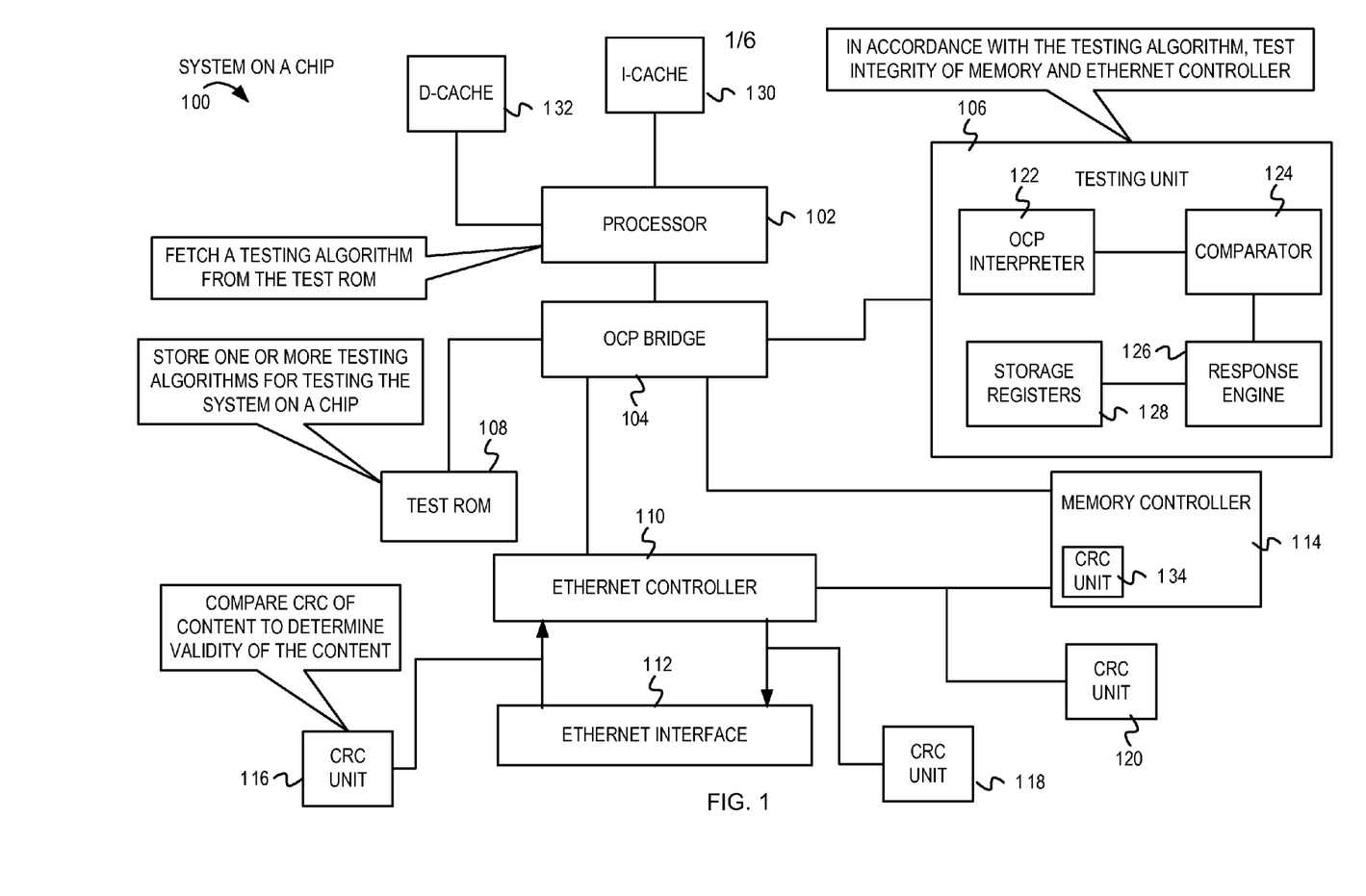
FIG. 1 is an example conceptual diagram illustrating a mechanism for functional testing of an integrated circuit.

FIG. 1 is an example conceptual diagram illustrating a mechanism for functional testing of an integrated circuit. FIG. 1 depicts a system-on-a-chip (SoC) 100 comprising an embedded processor 102, an instruction cache (I-cache) 130, and a data cache (D-cache) 132. The SoC 100 also comprises an open core protocol (OCP) bridge 104, a testing unit 106, a test ROM 108, and a memory controller 114. The SoC 100 comprises an Ethernet controller 110, an Ethernet interface 112, and cyclic redundancy check (CRC) units 116, 118, 120, and 134. The testing unit 106 comprises an OCP interpreter 122, a comparator 124, a response engine 126, and storage registers 128. In FIG. 1, the processor 102 is coupled to the OCP bridge 104, the I-cache 130, and the D-cache 132. The OCP bridge 104 is coupled to the testing unit 106, the memory controller 114, the Ethernet controller 110, and to the test ROM 108. The Ethernet controller 110 is coupled to the Ethernet interface 112. The CRC unit 118 is coupled to a transmit path between the Ethernet controller 110 and the Ethernet interface 112 and analyses data to be transmitted via the Ethernet interface 112. The CRC unit 116 is coupled to a receive path between the Ethernet controller 110 and the Ethernet interface 112 and analyses data received via the Ethernet interface 112. The CRC unit 120 is coupled along a path between the Ethernet controller 110 and the memory controller 114 and analyses data provided from and received by the Ethernet controller 110. The CRC unit 134 is implemented within the memory controller 114 and analyses data received by and provided from the memory controller 114. Although not shown in FIG. 1, the SoC 100 can also comprise a Serial Peripheral Interface (SPI) to enable the processor 102 to boot.

The processor 102 can manipulate two types of information—an opcode and data. The opcode (also known as an instruction) causes the processor to execute a particular operation. The opcode can be stored in the I-cache 130. The data accessed by the processor 102 (e.g., in response to executing an opcode for reading from a memory address, modifying content stored at a memory address, etc.) can be stored in the D-cache 132. Typically, the processor 102 can request for information (e.g., an opcode and/or data) stored at a particular memory address. A cache controller (not shown in FIG. 1) can determine if the information corresponding to the memory address is available in the cache. If so (i.e., a "cache hit" condition), the information can be accessed from the cache and can be provided to the processor 102. Otherwise (i.e., a "cache miss" condition), information corresponding to the memory address can be accessed from a storage device, the information can be provided to the processor 102, and the information can be stored in the appropriate cache. In some examples, storing the information in the cache can cause old information to be expunged from the cache. For the I-cache 130, the old information (e.g., least recently used opcode) can be discarded and can be replaced by a new opcode (e.g., an opcode accessed from the storage device). For the D-cache 132, if the least recently used data is "dirty", the dirty data is first written to the storage device (for data consistency) and is then discarded from the D-cache 132 to make space for new data. If the least recently used data is not dirty, the data is discarded from the D-cache 132 to make space for the new data. The testing unit 106 can, based on the output of the processor 102 during cache operations, test for the validity of the processor 102 and consequently, the I-cache 130 and the D-cache 132. As will be described below, for testing the I-cache 130, the memory address generated by the processor 102 during an I-cache miss condition can be used to validate the operations of the processor 102. Also, for testing the D-cache 132, the memory address and the data generated by the processor 102 during a D-cache miss condition can be used to validate the operations of the processor 102.

The test ROM 108 can comprise one or more testing algorithms (e.g., embedded processor specific memory testing algorithms, interface specific testing algorithms, etc.) that can be executed for testing various components of the SoC 100 including the I-cache 130, the D-cache 132, communication interfaces (e.g., the Ethernet interface 112), etc. The testing unit 106 can cause one or more cache memory testing algorithms of the test ROM 108 to be executed depending on functional logic (e.g., cache-fill tests, cache fetch tests) of the cache memories to be tested. In one example, a memory-testing algorithm such as a March algorithm can be stored in the test ROM 108 and the testing unit 106 can analyze the cache memories in accordance with the March algorithm. It is noted that in other examples, any suitable algorithm (e.g., March G algorithm) can be implemented to test the validity of the cache memories.

The OCP bridge 104 can be used for on-chip communication in the SoC 100. The OCP bridge 104 can serve as an interface between the processor 102 and the testing unit 106. On executing an instruction of a cache memory testing algorithm of the test ROM 108, the processor 102 can determine a memory address, data, and/or control signals. The OCP bridge 104 can convert the determined memory address/data/control signals into OCP requests (e.g., OCP READ requests, OCP WRITE requests, etc.) and can provide the OCP requests to the memory controller 114 to enable execution of the instruction. The OCP interpreter 122 of the testing unit 106 can intercept these OCP requests generated by the OCP interpreter 122 and can translate the OCP requests into a format that is recognized by other components (e.g., the comparator) of the testing unit 106. Likewise, the OCP interpreter 122 can translate requests generated by the testing unit 106 into corresponding OCP requests and the OCP bridge 104, in turn, can convert the OCP requests into memory address/data/control signals to be provided to the processor 102.

On receiving an indication of an I-cache testing algorithm to be implemented, the response engine 126 (e.g., an opcode generator (not shown) of the response engine 126) can generate the opcodes associated with the I-cache testing algorithm. For example, the opcodes associated with the I-cache testing algorithm can cause the processor 102 to jump to various (non-sequential) memory addresses of the I-cache 130. The testing unit 106 can also provide a first opcode of the I-cache testing algorithm for execution by the processor 102. The processor 102 can execute the opcode, interpret a memory address from which a next opcode should be fetched ("interpreted memory address"), and transmit the interpreted memory address on an address bus. The comparator 124 of the testing unit 106 can receive the interpreted memory address (e.g., via the OCP interpreter 122), compare the interpreted memory address with a memory address that was expected to be generated by the processor 102 in response to the opcode ("expected memory address"), and determine whether the interpreted memory address matches the expected memory address. If there is a match, then the response engine 126 can identify the next opcode (e.g., an opcode associated with the interpreted memory address) and provide the next opcode to the processor 102. Otherwise, the response engine 126 can generate an error notification and can cause the I-cache testing algorithm to be aborted. Operations for testing the validity of the processor 102 and the I-cache 130 utilizing the testing unit 106 implemented internally within the SoC 100 will further be described in greater detail with reference to FIGS. 2-3.

On receiving an indication of a D-cache testing algorithm to be implemented, the response engine 126 can determine the opcodes and/or the data associated with the D-cache testing algorithm. The testing unit 106 can store a predetermined data pattern (e.g., data that corresponds to each opcode of the D-cache testing algorithm) from the test ROM 108 in the storage registers 128 and can cause the processor 102 to execute the D-cache testing algorithm from the test ROM 108. The processor 102 typically executes the opcode, interprets a memory address from which data should be fetched, and transmits the interpreted memory address on the address bus. In response to the interpreted memory address from the processor 102, the response engine 126 can read the corresponding data from the storage registers 128 and can provide the data to the processor 102. The data can also be stored in the D-cache 132. The storage registers 128 can be configured to mimic the behavior of external memory storage units. In accordance with the D-cache testing algorithm, the data pattern stored in the D-cache 132 can be dirtied. The processor 102 can generate a request to mirror the dirty data from the D-cache ("generated data") to the storage device. At each stage of execution of the D-cache testing algorithm, the comparator 124 can receive the interpreted memory address and/or the generated data (e.g., via the OCP interpreter 122), compare the interpreted memory address with the expected memory address and/or can compare the generated data with the expected data to determine the validity of the processor 102 and the D-cache 132. Operations for testing the validity of the processor 102 and the D-cache 132 utilizing the testing unit 106 internally within the SoC 100 will further be described in greater detail with reference to FIGS. 4-5.

Also, as depicted in FIG. 1, the CRC units 116, 118, 120, 134 may be located at different output interfaces and at critical intermediate signals/buses. The CRC value of the data or signal at the output interface (or on the bus) may be compared against an expected CRC value. With reference to FIG. 1, validity of the Ethernet communication interface of the SoC can be tested using the CRC units 116, 118, 120, 134. The memory controller 114 can transmit test data in an Ethernet packet to the Ethernet controller 110. The CRC unit 122 can compare the CRC value of the test Ethernet packet to the expected CRC value at the output interface of the memory controller 114. The CRC unit 120 can compare the CRC value of the test Ethernet packet to the expected CRC value at the input interface of the Ethernet controller 110, while the CRC unit 118 can compare the CRC value of the test Ethernet packet to the expected CRC value at the output interface of the Ethernet controller 110 in the transmit path. After the test Ethernet packet loops back through the Ethernet communication channel, the CRC unit 134 compares the CRC value of the test Ethernet packet to the expected CRC value at the input interface of the Ethernet controller 110 in the receive path. In one implementation, the processor 102 could receive the CRC values of the test Ethernet packet at each output interface or bus and could determine whether the received CRC values match the expected CRC value. In another implementation, the CRC units 116, 118, 120, 134 themselves could compare the CRC value of the test Ethernet packet with the expected CRC value and could transmit a message to the processor 102 indicating whether the output interface/bus passes or fails the CRC test. Based on this information, the processor 102 can identify the output interfaces and/or buses that do not operate as expected.

The testing unit 106 can operate in conjunction with the test ROM 108 to achieve comprehensive and faster testing of the caches memories associated with the processor 102, for example, in automatic test equipment (ATE) environments. Various embodiments can be implemented for providing inputs to the SoC 100. In one embodiment, the testing unit 106 can execute directed functional tests. In another embodiment, a loopback method can be implemented where SoC outputs are wired to the SoC inputs. The loopback method can be implemented for testing communication interfaces (e.g., the Ethernet interface), as described above. However, if the loopback method cannot be implemented (e.g., if the communication interface does not support the loopback method), pseudo-randomly generated data can be transmitted as the SoC inputs. As another embodiment, inputs to the SoC 100 could be received from one or more on-chip memory units. The on-chip memory units could comprise pre-determined values (e.g., pre-filled by the processor 102) or expected memory address values and expected data values for the testing algorithms.

Figure 2:
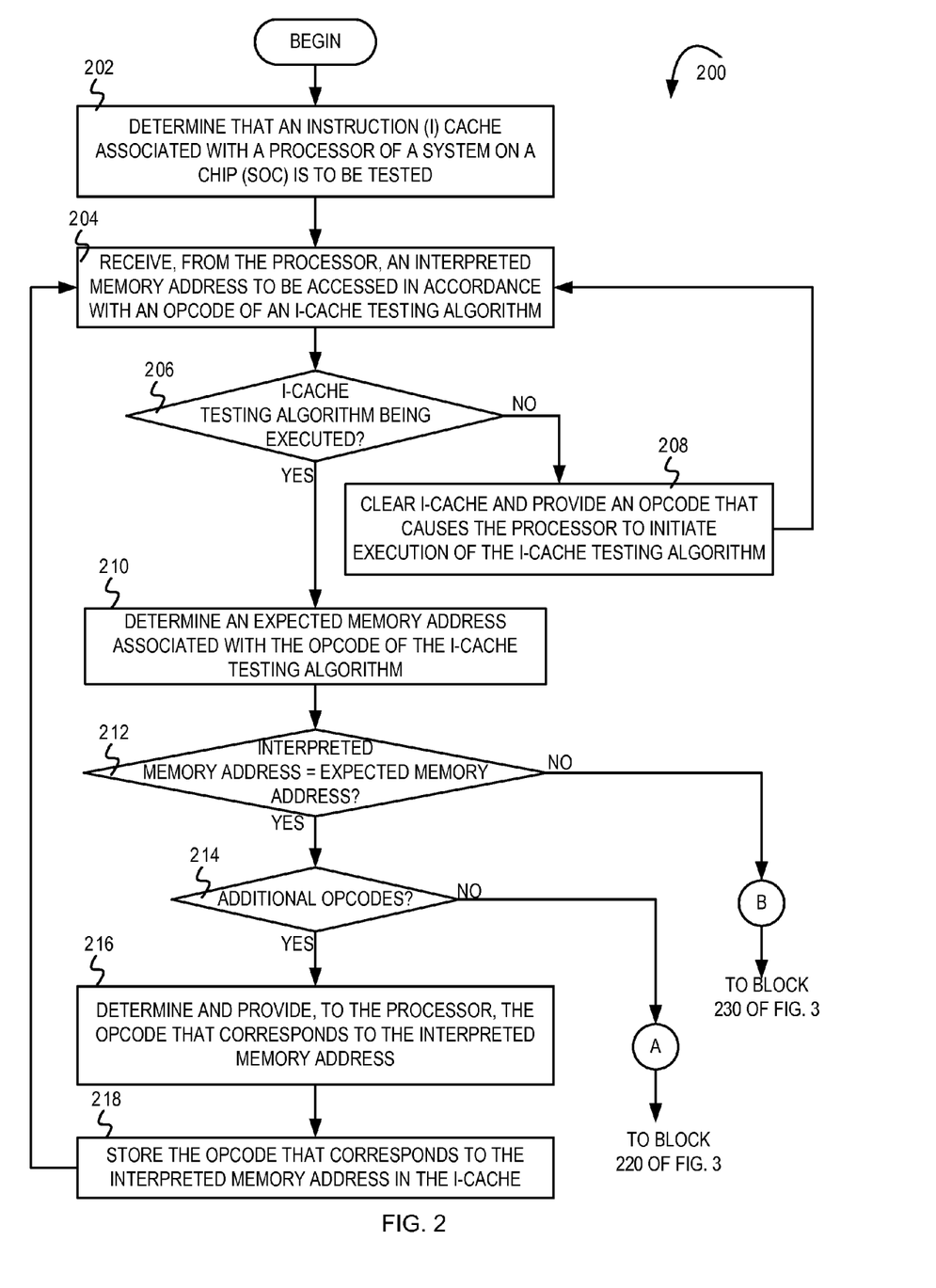
FIG. 2 is a flow diagram illustrating example operations for functional testing of an instruction cache.
Figure 3:
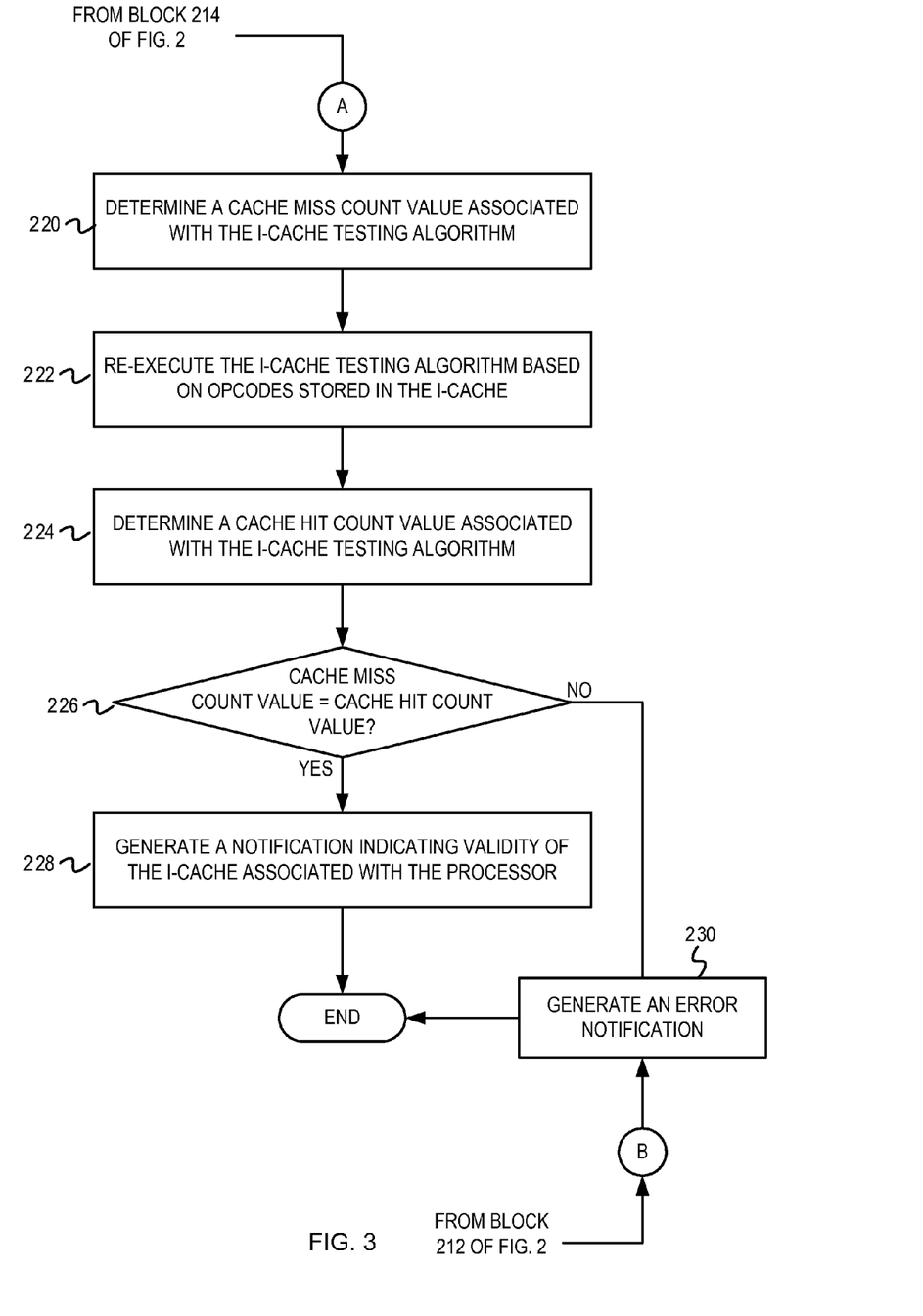
FIG. 3 is a continuation of FIG. 2 and also depicts the flow diagram illustrating example operations for functional testing of the instruction cache.

FIG. 2 and FIG. 3 depict a flow diagram ("flow") 200 illustrating example operations for functional testing of an instruction cache (I-cache). The flow 200 begins at block 202.

At block 202, it is determined that an I-cache associated with a processor of a system on a chip (SoC) is to be tested. For example, the testing unit 106 of FIG. 1 (implemented internally within the SoC 100) can determine that the I-cache 130 associated with the processor 102 of the SoC 100 is to be tested in accordance with an I-cache testing algorithm stored in the test ROM 108. A March algorithm, a March G algorithm, or other suitable set of instructions can be executed for testing the integrity of the I-cache 130. In one implementation, the testing unit 106 can receive an indication to execute one or more of the I-cache testing algorithms (e.g., based on user input, based on determining to execute the I-cache testing algorithm at a pre-configured time instant, etc.). In another implementation, the testing unit 106 may receive a trigger from an external tester in an ATE environment. The trigger from the external tester may be generated based on user input, a scheduled test, etc. In one implementation, the processor 102 can select and determine to execute one or more of the I-cache testing algorithms stored within the test ROM 108. The processor 102 may also communicate the selected one or more I-cache testing algorithms to the testing unit 106. In another implementation, the testing unit 106 can determine to execute one or more of the I-cache testing algorithms and can communicate the selected one or more I-cache testing algorithms (or instructions of the selected I-cache testing algorithms) to the processor 102. When the I-cache testing algorithm to be executed is identified and initialized, the testing unit 106 can read opcodes associated with the I-cache testing algorithm from the test ROM 108. In one example, on identifying the I-cache testing algorithm to be executed, the processor 102, itself, can read an opcode (or an instruction) of the I-cache testing algorithm from the test ROM 108. As another example, the test ROM 108 can comprise functionality (e.g., a background process) that initializes the I-cache testing algorithm to be executed and provides a first opcode of the I-cache testing algorithm to the processor 102. As another example, the testing unit 106 can provide the first opcode of the I-cache testing algorithm to the processor 102. The flow continues at block 204.

At block 204, a memory address to be accessed is received from the processor in accordance with the opcode of the I-cache testing algorithm. On receiving the opcode of the I-cache testing algorithm, the processor 102 can interpret the opcode to determine a memory address ("interpreted memory address") to be accessed as indicated by the instruction. For example, the processor 102 can interpret the instruction of the I-cache testing algorithm to determine the memory address (e.g., of a storage device) to be accessed as indicated by the instruction. The interpreted memory address can be indicative of the memory address from which a next opcode is to be fetched (e.g., from DDR address space). In some implementations, the processor 102 can access the I-cache 130 to determine whether an opcode corresponding to the interpreted memory address is available in the I-cache 130. If the opcode corresponding to the interpreted memory address is available in the I-cache 130, the processor 102 can retrieve the opcode from the I-cache 130. If the opcode corresponding to the interpreted memory address is not available in the I-cache 130, the processor 102 can transmit the interpreted memory address (e.g., via an address bus) to the OCP bridge 104 to retrieve the opcode from an external storage device. As will be described below, the testing unit 106 can intercept and analyze the interpreted memory address and can provide an opcode to enable the processor 102 to execute a next instruction of the I-cache testing algorithm. The flow continues at block 206.

At block 206, it is determined whether the I-cache testing algorithm is being executed. For example, the testing unit 106 can determine whether the I-cache testing algorithm is being executed. In determining whether the I-cache testing algorithm is being executed, the testing unit 106 can determine whether the interpreted memory address was received from the testing unit 106 or from the test ROM 108. The interpreted memory address being received from the testing unit 106 (e.g., from the OCP interpreter 122) can serve as an indication that the I-cache testing algorithm is being executed. The interpreted memory address being received from any other component of the SoC (e.g., the test ROM 108, the processor 102, etc.) can serve as an indication that the I-cache testing algorithm has not been started or is not being executed. If it is determined that the I-cache testing algorithm is being executed, the flow continues at block 210. Otherwise, the flow continues at block 208.

At block 208, the I-cache is cleared and an opcode that causes the processor to initiate the I-cache testing algorithm is provided to the processor. The flow 200 moves from block 206 to block 208 if it is determined that the processor 102 has not started executing the I-cache testing algorithm. Therefore, the testing unit 106 can clear and initialize the I-cache 130. The testing unit 106 can also identify and provide an opcode to cause the processor 102 to begin execution of the I-cache testing algorithm. In some implementations, the testing unit 106 can cause the test ROM 108 (e.g., a background process of the test ROM 108) to clear and initialize the I-cache and to provide the opcode to the processor 102. The flow loops back to block 204.

At block 210, an expected value of the memory address is determined. For example, the comparator 124 of the testing unit 106 can determine the expected value of the memory address associated with the opcode of the I-cache testing algorithm ("expected memory address"). The expected memory address can indicate a known memory location at which a next opcode of the I-cache testing algorithm is stored. In one example, the comparator 124 can access a predetermined memory unit to identify the expected memory address based on the I-cache testing algorithm being executed and based on knowledge of an opcode last provided to the processor 102 by the testing unit 106. In another example, the comparator 124 can access the test ROM 108 to identify the expected memory address for the opcode last provided to the processor 102. The flow continues at block 212.

At block 212, it is determined whether the interpreted memory address is equal to the expected memory address. For example, the comparator 124 can determine whether the interpreted memory address is equal to the expected memory address. Comparing the interpreted memory address against the expected memory address can enable the comparator 124 to determine whether the processor 102 can accurately interpret the opcodes/instructions provided to the processor 102. If it is determined that the interpreted memory address is equal to the expected memory address, the flow continues at block 214. Otherwise, the flow continues at block 230 in FIG. 3.

At block 214, it is determined whether additional opcodes of the I-cache testing algorithm that should be provided for execution. For example, the testing unit 106 can determine whether there exist additional instructions of the I-cache testing algorithm that should be provided to the processor 102 for execution. If it determined that additional instructions of the I-cache testing algorithm should be executed, the flow continues at block 216. Otherwise, the flow continues at block 220 in FIG. 3.

At block 216, an opcode that corresponds to the interpreted memory address is determined and provided to the processor. Because the I-cache 130 was cleared and initialized prior to executing the I-cache testing algorithm, the interpreted memory address does not exist in the I-cache 130. In other words, the testing unit 106 encounters a cache miss condition for the interpreted memory address. For example, the response engine 126 of the testing unit 106 may receive an indication, from the comparator 124, that the interpreted memory address matches the expected memory address. Consequently, the response engine 126 can retrieve the opcode that corresponds to the interpreted memory address. In one example, the response engine 126 can read the opcode associated with interpreted memory address from the storage registers 128. In another example, the response engine 126 can read the opcode associated with the interpreted memory address from other suitable storage units or may receive the opcode associated with the interpreted memory address from the memory controller 114. The response engine 126 can then provide the opcode associated with the interpreted memory address to the processor 102. The processor 102, in turn, can execute the opcode and can generate a next interpreted memory address from which a next opcode is to be fetched. The flow continues at block 218.

At block 218, the opcode associated with the interpreted memory address is stored in the I-cache. In one example, the response engine 126 can store the opcode associated with the interpreted memory address in the I-cache 130. As another example, the processor 102 can store the opcode associated with the interpreted memory address (received at block 216) in the I-cache 130. Thus, subsequent requests for the interpreted memory address can be serviced from the I-cache 130. The flow loops back to block 204 where the testing unit can analyze the next interpreted address received from the processor 102.

At block 220, a cache miss count value associated with the I-cache testing algorithm is determined. The flow 200 moves from block 214 in FIG. 2 to block 220 in FIG. 3 on determining that no additional instructions of the I-cache testing algorithm are to be executed. As described above, a cache miss condition is encountered when an opcode corresponding to the interpreted memory address cannot be determined from the I-cache 130. Each time the cache miss condition is encountered, the response engine 126 of the testing unit 106 can determine the opcode associated with the interpreted memory address (described at block 216), provide the opcode to the processor 102, and increment a cache miss counter. After it is determined that no additional instructions of the I-cache testing algorithm are to be executed, the response engine 126 can determine the value of the cache miss counter as the cache miss count value. The response engine 126 may also set a flag (e.g., toggle a predetermined flag bit from "0" to "1") to indicate that the I-cache testing algorithm has been executed once and that the I-cache 130 now comprises all the opcodes associated with the I-cache testing algorithm. The flow continues at block 222.

At block 222, the I-cache testing algorithm is re-executed based on the opcodes stored in the I-cache. The testing unit 106 can cause the processor 102 to re-execute the I-cache testing algorithm. On determining that the I-cache testing algorithm has been executed once (e.g., on determining that no additional instructions are to be executed), the response engine 126 can provide, to the processor 102, an opcode that causes the processor 102 to re-execute the I-cache testing algorithm. For example, the response engine 126 can provide the first opcode of the I-cache testing algorithm to the processor 102. As described above, the processor 102 can execute the received opcode and can determine an interpreted memory address from which the next opcode is to be fetched. In one implementation, the processor 102 can determine the opcode associated with the interpreted memory address from the I-cache 130. Therefore, the processor 102 may not provide the interpreted memory address to the OCP bridge 104 and to the testing unit 106. The flow continues at block 224.

At block 224, a cache hit count value associated with the I-cache testing algorithm is determined. As described above, a cache hit condition is encountered when an opcode corresponding to the interpreted memory address can be determined from the I-cache 130. In one example, each time the cache hit condition is encountered, the processor 102 can increment a cache hit counter. After the I-cache testing algorithm has been executed again, the processor 102 can provide the value of the cache hit counter ("cache hit count value") to the comparator 124 of the testing unit 106. As another example, each time the cache hit condition is encountered, the response engine 126 of the testing unit 106 can retrieve the opcode associated with the interpreted memory address (from the I-cache 130), provide the opcode to the processor 102, and increment the cache hit counter. After the I-cache testing algorithm has been executed again, the response engine 126 can determine the cache hit count value. The flow continues at block 226.

At block 226, it is determined whether the cache hit count value is equal to the cache miss count value. The cache hit count value being equal to the cache miss count value can indicate that there are no inconsistencies in the processor's execution of the opcodes, that addressing/storage/information accessing operations of the I-cache 130 are functional, etc. If it is determined that the cache hit count value is equal to the cache miss count value, the flow continues at block 228. Otherwise, the flow continues at block 230.

At block 228, a notification indicating validity of the I-cache associated with the processor is generated. In one example, the response engine 126 can provide the notification to the processor 102 to indicate the validity of the I-cache 130 and to indicate that the I-cache testing algorithm was successfully executed. In another example, the response engine 126 can cause the processor 102 to access a first predetermined memory location of the test ROM 108 if the I-cache testing algorithm was successfully executed. The first predetermined memory location can comprise a predetermined value that indicates that the I-cache testing algorithm was successfully executed. From block 228, the flow ends.

At block 230, an error notification is generated. The flow 200 moves from block 226 to block 230 if the comparator 124 determines that the cache miss count value is not equal to the cache hit count value. The flow 200 also moves from block 212 of FIG. 2 to block 230 of FIG. 3 if the comparator 124 determines that the interpreted memory address is not equal to the expected memory address. In one example, the response engine 126 can provide the notification to the processor 102 to indicate the invalidity of the I-cache 130 and to indicate that the I-cache testing algorithm was not successfully executed. In another example, the response engine 126 can cause the processor 102 to access a second predetermined memory location of the test ROM 108 if the I-cache testing algorithm was not successfully executed. The second predetermined memory location can comprise a predetermined value that indicates that the I-cache testing algorithm was not successfully executed. On receiving the error notification, the processor 102 can halt execution of all the I-cache testing algorithms and can prompt for system administrator input. In one implementation, the processor 102 may only halt execution of the current I-cache testing algorithm and may start executing a next I-cache testing algorithm. From block 230, the flow ends. It is noted that in some implementations, after execution of the I-cache testing algorithm is completed (after block 228 or block 230), the processor 102 can determine whether a subsequent I-cache test algorithm is to be executed.

Figure 4:
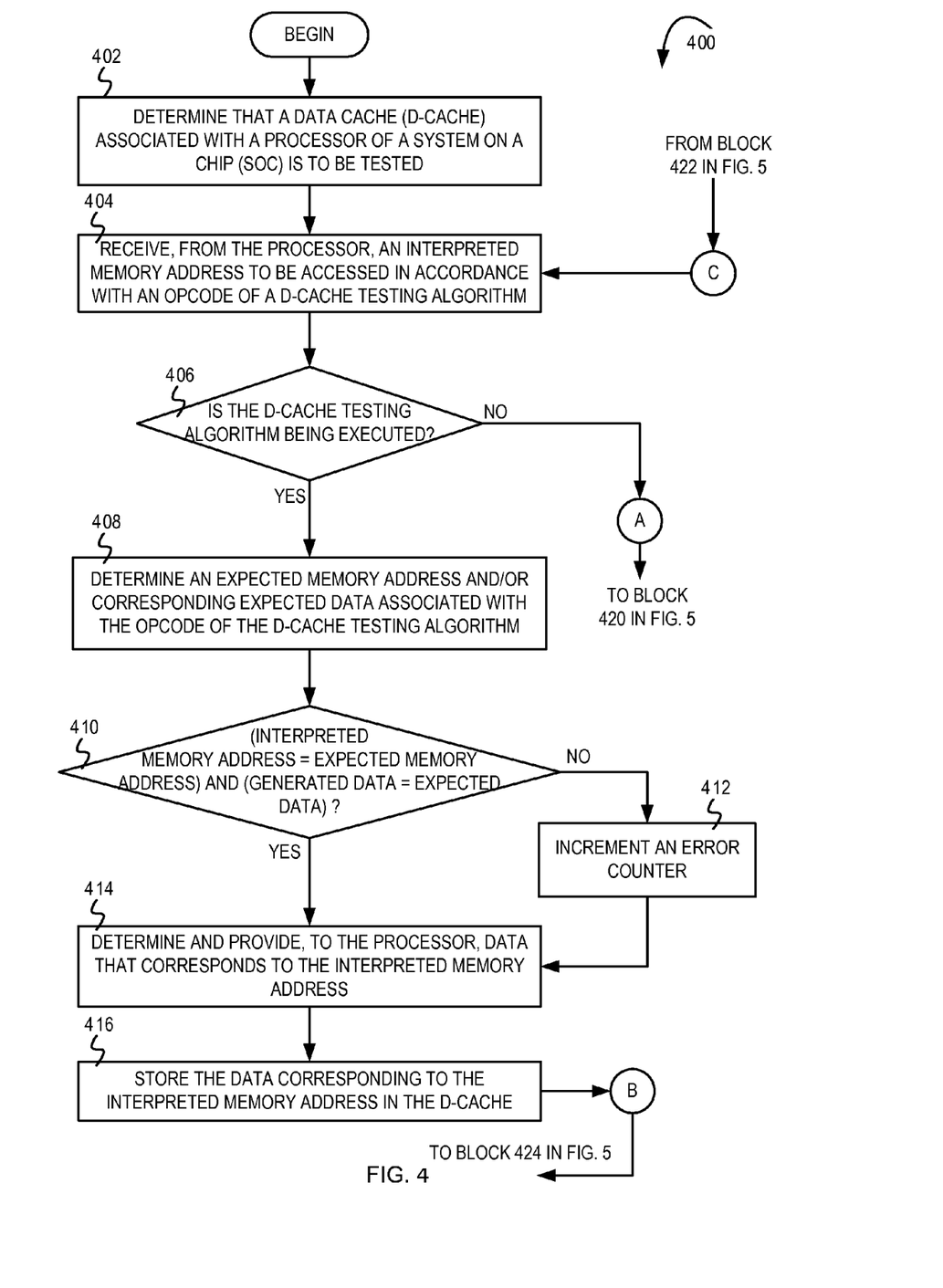
FIG. 4 is a flow diagram illustrating example operations for functional testing of a data cache.
Figure 5:
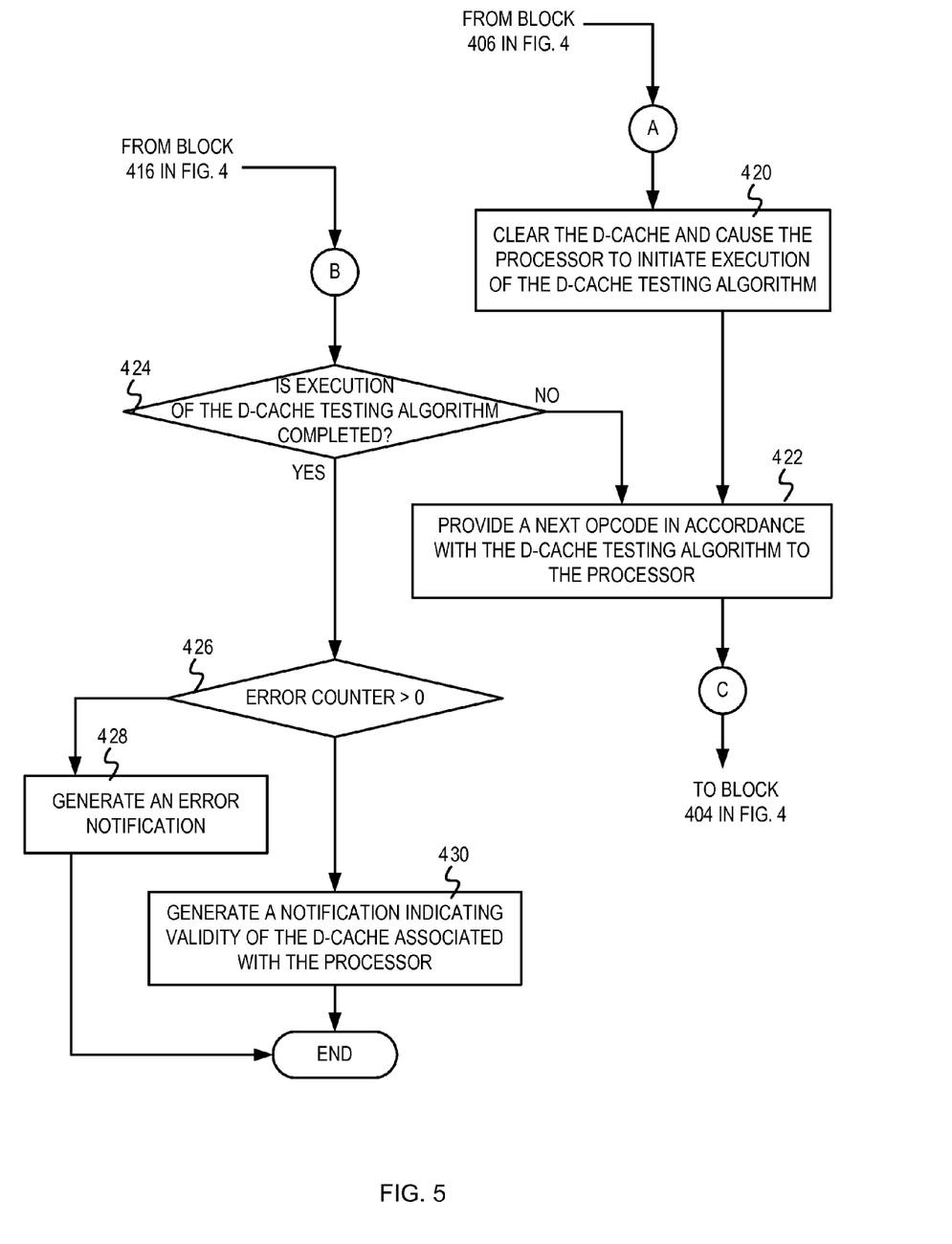
FIG. 5 is a continuation of FIG. 4 and also depicts the flow diagram illustrating example operations for functional testing of the data cache.

FIG. 4 and FIG. 5 depict a flow diagram 400 illustrating example operations for functional testing of a data cache (D-cache). The flow 400 begins at block 402 in FIG. 4.

At block 402, it is determined that a D-cache associated with a processor of a SoC is to be tested. For example, the testing unit 106 of FIG. 1 (implemented internally within the SoC 100) can determine that the integrity of the D-cache 132 is to be tested in accordance with a D-cache testing algorithm. In one implementation, the testing unit 106 can receive an indication to execute one or more of the D-cache testing algorithms (e.g., based on user input, based on determining to execute the D-cache testing algorithm at a pre-configured time instant, etc.). In another implementation, the testing unit 106 may receive a trigger from an external tester in an ATE environment. The trigger from the external tester may be generated based on user input, a scheduled test, etc. In one implementation, the test ROM 108 (e.g., a background process of the test ROM 108) can initialize the D-cache 132 and the testing unit 106 before execution of the D-cache testing algorithm begins. In another implementation, the testing unit 106 can read opcodes that constitute the D-cache testing algorithm from the test ROM 108 and can initialize the D-cache 132. Data corresponding to each opcode of the D-cache testing algorithm can be retrieved (e.g., from the test ROM 108, a predetermined external storage unit, etc.) and stored in the storage registers 128. The testing unit 106 can communicate an indication of the selected one or more D-cache testing algorithms to the processor 102. For example, the testing unit 106 can provide a memory location of the test ROM 108 from which a first opcode of the D-cache testing algorithm can be accessed. The processor 102, in turn, can access the test ROM 108, read the appropriate memory location of the test ROM 108, and determine and execute the opcode of the D-cache testing algorithm. The flow continues at block 404.

At block 404, an address to be accessed in accordance with an opcode of the D-cache testing algorithm is received from the processor. On receiving the opcode of the D-cache testing algorithm, the processor 102 can interpret the opcode to determine a memory address ("interpreted memory address") to be accessed. For example, the processor 102 can interpret the opcode of the D-cache testing algorithm (read from the test ROM 108 at block 204) to determine the memory address (e.g., of a storage device) from which data is to be accessed. In some implementations, the processor 102 can access the D-cache 132 to determine whether data corresponding to the interpreted memory address is available in the D-cache 132. If the data corresponding to the interpreted memory address is available in the D-cache 132, the processor 102 can read the data from the D-cache 132. If the data corresponding to the interpreted memory address is not available in the D-cache 132, the processor 102 can transmit the interpreted memory address (e.g., via an address bus) to the OCP bridge 104 to retrieve the data from an external storage device. The data received by the processor 102 can be stored in the D-cache 132 and old data entries that are discarded from the D-cache 132 (to make space for the received data) can then be analyzed by the testing unit 106. For example, an instruction to fetch data from external storage device can result in pushing out an old data entry from the D-cache 132. This can result in a write request to write the old data entry to the external storage device (for data consistency). The testing unit 106 can intercept the write request, and the OCP interpreter 122 of the testing unit 106 can convert the data to be written to the external storage device into a format that is recognized by other components of the testing unit 106. The testing unit 106 can ensure correctness of the data to be written to the external storage device and of a destination memory address to which the data is to be written. The flow continues at block 406.

At block 406, it is determined whether the D-cache testing algorithm is being executed. For example, the testing unit 106 can determine whether the D-cache testing algorithm is being executed. In determining whether the D-cache testing algorithm is being executed, the testing unit 106 can determine whether the interpreted memory address was received from the testing unit 106 or from the test ROM 108. The interpreted memory address being received from the testing unit 106 (e.g., from the OCP interpreter 122) can serve as an indication that the D-cache testing algorithm is being executed. The interpreted memory address being received from any other component of the SoC (e.g., the test ROM 108, the processor 102, etc.) can serve as an indication that the D-cache testing algorithm has not been started or is not being executed. If it is determined that the D-cache testing algorithm is being executed, the flow continues at block 408. Otherwise, the flow continues at block 420 in FIG. 5.

At block 408, an expected memory address and corresponding expected data associated with the opcode of the D-cache testing algorithm is determined. For example, the comparator 124 of the testing unit 106 can determine the expected memory address and the corresponding expected data. The expected memory address can be a known memory location at which corresponding data is stored. In one example, the comparator 124 can access a predetermined memory unit to identify the expected memory address and the expected data based on the D-cache testing algorithm being executed by the processor 102 and based on knowledge of a last opcode provided to the processor 102. In another example, the comparator 124 can access the test ROM 108 to identify the expected memory address and the expected data. In another example, the comparator 124 can store the expected memory addresses and the corresponding expected data for each instruction of the D-cache testing algorithm in the storage registers 128 prior to initiating execution of the D-cache testing algorithm. The flow continues at block 410.

At block 410, it is determined whether the interpreted memory address is equal to the expected memory address and whether the generated data is equal to the expected data. For example, the comparator 124 can determine whether the interpreted memory address is equal to the expected memory address. When the D-cache testing algorithm is executed for the first time (e.g., when a set of memory addresses are generated by the processor 102 for the first time), corresponding data is not available in the D-cache 132. Thus, the comparator 124 may only receive the interpreted memory address from the processor 102. The comparator 124 may compare the interpreted memory address with the expected memory address and may provide the corresponding data to the processor 102. However, when the D-cache testing algorithm is executed again (e.g., when the set of memory addresses are generated by the processor 102 again), corresponding data can be accessed from the D-cache 132. The D-cache testing algorithm can cause the processor 102 to modify the data accessed from the D-cache 132 (i.e., to dirty the D-cache 132). After all the data stored in the D-cache is dirtied, the D-cache testing algorithm can cause a new set of memory addresses to be generated by the processor 102 and can cause the processor 102 to access a new set of data from the new set of memory addresses. The processor 102 can receive corresponding data for the new set of memory addresses thus forcing the processor 102 to flush the dirty data from the D-cache 132 to an external storage device and to discard existing data of the D-cache 132 to make space for the new set of data corresponding to the new set of memory addresses. The processor 102 can generate a write-back request to flush the dirty data to the external storage device. The testing unit 106 can intercept the write-back request comprising the dirty data (also referred to herein as generated data) and can compare the generated data with the expected data. The testing unit 106 can also validate the new set of addresses and can provide corresponding data for the new set of addresses to the processor 102, as described above. If it is determined that the interpreted memory address is equal to the expected memory address and that the generated data is equal to the expected data, the flow continues at block 414. Otherwise, the flow continues at block 412.

At block 412, an error counter is incremented. For example, the response engine 126 can increment the error counter if it is determined that the interpreted memory address is not equal to the expected memory address and/or that the generated data is not equal to the expected data. The flow continues at block 414.

At block 414, the data that corresponds to the interpreted memory address is determined and provided to the processor. For example, the response engine 126 can provide the data that corresponds to the interpreted memory address to the processor 102. Because the testing unit 106 cleared and initialized the D-cache 132 prior to initiating execution of the D-cache testing algorithm, the data that corresponds to the interpreted memory address does not exist in the D-cache 132. In other words, the testing unit 106 encounters a cache miss condition for the interpreted memory address. Consequently, in one example, the response engine 126 can retrieve the data that corresponds to the interpreted memory address from the storage registers 128. In another example, the response engine 126 can determine the data associated with the interpreted memory address from other suitable storage units or may receive the data associated with the interpreted memory address the memory controller 114. The response engine 126 can provide the data that corresponds to the interpreted memory address to the processor 102. The flow continues at block 416.

At block 416, the data that corresponds to the interpreted memory address is stored in the D-cache 132. In one example, the response engine 126 can store the data that corresponds to the interpreted memory address in the D-cache 132. As another example, on receiving the data, the processor 102 can store the data that corresponds to the interpreted memory address in the D-cache 132. Thus, subsequent requests for data that correspond to the interpreted memory address can be serviced from the D-cache 132. The processor 102 can then read a next opcode of the D-cache testing algorithm from the test ROM 108. In some implementations, the response engine 126 of the testing unit 106 can provide the next opcode of the D-cache testing algorithm to the processor 102. The flow continues at block 424 in FIG. 5 where it is determined whether there exist additional instructions of the D-cache testing algorithm to be executed.

At block 420, the D-cache is cleared and an opcode that causes the processor to initiate the D-cache testing algorithm is provided to the processor. The flow 400 moves from block 406 in FIG. 4 to block 420 in FIG. 5 if it is determined that the D-cache testing algorithm is not being executed. When the interpreted memory address is not received from the OCP interpreter 122, the testing unit 106 can consider this as an indication that the processor 102 has not started executing the D-cache testing algorithm. Therefore, the testing unit 106 can clear and initialize the D-cache 132. The testing unit 106 can also identify and provide an opcode to cause the processor 102 to begin execution of the D-cache testing algorithm. For example, the testing unit 106 can provide a first opcode of the D-cache testing algorithm to the processor 102. As another example, the testing unit 106 can provide a memory address of the test ROM 108 from which the processor 102 can read the first opcode of the D-cache testing algorithm. The flow continues at block 422.

At block 422, a next opcode of the D-cache testing algorithm is provided to the processor. In one implementation, the response engine 126 can provide the next opcode of the D-cache testing algorithm to the processor 102. In another implementation, the response engine 126 can cause the processor 102 to access the next opcode of the D-cache testing algorithm from the test ROM 108. The processor 102, in turn, can execute the next opcode and can generate a next interpreted memory address and/or a next generated data (e.g., in a write-back request). The flow loops back to block 404 of FIG. 4 where the testing unit 106 can analyze the next interpreted address and/or the next generated data received from the processor 102.

At block 424, it is determined whether execution of the D-cache testing algorithm is completed. The flow 400 moves from block 416 in FIG. 4 to block 424 in FIG. 5 after the data corresponding to the interpreted memory address is provided to the processor 102 and is stored in the D-cache 132. For example, the testing unit 106 can determine whether execution of the D-cache testing algorithm is completed. In one implementation, the testing unit 106 may access the test ROM 108 to determine whether additional instructions of the D-cache testing algorithm are available. In another implementation, the testing unit 106 can determine whether a control signal indicating that the D-cache testing algorithm is completed was received from the processor 102. If it is determined that execution of the D-cache testing algorithm is completed, the flow continues at block 426. Otherwise, the flow continues at block 422 where a next opcode is provided to the processor 102 in accordance with the D-cache testing algorithm.

At block 426, it is determined whether the value of the error counter is greater than zero. The value of the error counter being greater than zero can serve as an indication that the processor 102 did not correctly interpret at least one opcode of the D-cache testing algorithm and/or that at least one set of dirty data in the D-cache 132 was not correctly flushed to the external storage device. If it is determined that the value of the error counter is greater than zero, the flow continues at block 428. Otherwise, the flow continues at block 430.

At block 428, a notification indicating validity of the D-cache associated with the processor is generated. In one example, the response engine 126 can provide the notification to the processor 102 to indicate the validity of the D-cache 132 and to indicate that the D-cache testing algorithm was successfully executed. In another example, the response engine 126 can cause the processor 102 to access a first predetermined memory location of the test ROM 108 if the D-cache testing algorithm was successfully executed. The first predetermined memory location can comprise a predetermined value that indicates that the D-cache testing algorithm was successfully executed. From block 428, the flow ends.

At block 430, an error notification is generated. The flow 400 moves from block 426 to block 430 if the comparator 124 determines that the error counter comprises a non-zero value. In one example, the response engine 126 can provide the notification to the processor 102 to indicate the invalidity of the D-cache 130 and to indicate that the D-cache testing algorithm was not successfully executed. In another example, the response engine 126 can cause the processor 102 to access a second predetermined memory location of the test ROM 108 if the D-cache testing algorithm was not successfully executed. The second predetermined memory location can comprise a predetermined value that indicates that the D-cache testing algorithm was not successfully executed. On receiving the error notification, the processor 102 can halt execution of all other processes and can prompt for system administrator input. From block 430, the flow ends. It is noted that in some implementations, after execution of the D-cache testing algorithm is completed (after block 428 or block 430), the processor 102 can determine whether a subsequent D-cache test algorithm is to be executed.

It should be understood that the depicted diagrams (FIGS. 1-5) are examples meant to aid in understanding embodiments and should not be used to limit embodiments or limit scope of the claims. Embodiments may perform additional operations, fewer operations, operations in a different order, operations in parallel, and some operations differently. For example, although FIG. 1 depicts the SoC 100 comprising an Ethernet communication interface, it is noted that techniques described herein for testing the validity of a communication interface can be implemented for various other interfaces such as a universal asynchronous receiver/transmitter (UART) interface, a subscriber line interface circuits (SLIC) interface, an inter-integrated circuit sound (12S) interface, a serial advanced technology attachment (SATA) interface, etc. Also, although FIG. 1 depicts the test ROM 108 comprising one or more testing algorithms for testing the validity of various components of the SoC 100, in other embodiments, a programmable read only memory (PROM) an erasable PROM (EPROM), an electrically erasable PROM (EEPROM), a one-time programmable (OTP) memory, or other suitable storage structure can be used to store the testing algorithms. In some embodiments, the testing algorithms may not be stored in the test ROM 108. Instead, a hardware (or software) unit could dynamically generate instructions to be executed as part of the testing algorithm. Also, the test ROM 108 or other storage structure could store instructions for executing multiple tests and the sequence in which these tests are executed could be controlled (e.g., by a control unit that is external to the SoC 100) using handshake mechanisms In some implementations, the testing unit 106 may determine whether the I-cache 130 is full after it is determined that the interpreted memory address is equal to the expected memory address (at block 212 of FIG. 2). The I-cache 130 being full can serve as an indication that subsequent instructions of the I-cache testing algorithm need not be executed and that the operations beginning at block 220 of FIG. 3 should be executed. In checking whether the I-cache 130 is full, the testing unit 106 can use the same I-cache testing algorithm to test I-caches with different sizes. If the testing unit 106 determines that the I-cache 130 is not full, the testing unit 106 can store the opcode associated with the interpreted memory address in the I-cache 130 and can provide the opcode to the processor 102. If the testing unit 106 determines that the I-cache 130 is full, the testing unit 106 may not store the opcode associated with the interpreted memory address in the I-cache 130 and can cause the processor 102 to execute the operations of block 220 of FIG. 3.

Although FIG. 4 and FIG. 5 describe an error counter being incremented (at block 412) if the interpreted memory address is not equal to the expected memory address and/or if the generated data is not equal to the expected data, embodiments are not so limited. In some embodiments, on determining that the interpreted memory address is not equal to the expected memory address and/or that the generated data is not equal to the expected data, the testing unit 102 can cause the processor 102 to halt execution of the D-cache testing algorithm. In one example, the response engine 126 can provide the notification to the processor 102 to indicate the invalidity of the D-cache 130 and to indicate that the D-cache testing algorithm was not successfully executed. In another example, the response engine 126 can cause the processor 102 to access a predetermined memory location of the test ROM 108 if the D-cache testing algorithm was not successfully executed. On receiving the error notification, the processor 102 can halt execution of all the D-cache testing algorithms and can prompt for system administrator input. In one implementation, the processor 102 may only halt execution of the current D-cache testing algorithm and may start executing a next D-cache testing algorithm.

Lastly, in some implementations, the processor 102 could enable or disable the testing unit 106. For example, in a SoC testing stage, the processor 102 may issue an "enable" control signal to enable the testing unit 106. The testing unit 106, in turn, can execute operations described herein to validate the interpreted memory address and/or the generated data. After the testing stage is complete, the processor 102 may issue a "disable" control signal to disable the testing unit 106. In another implementation, the testing unit 106 can issue control signals to cause the processor 102 to execute one or more testing algorithms.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
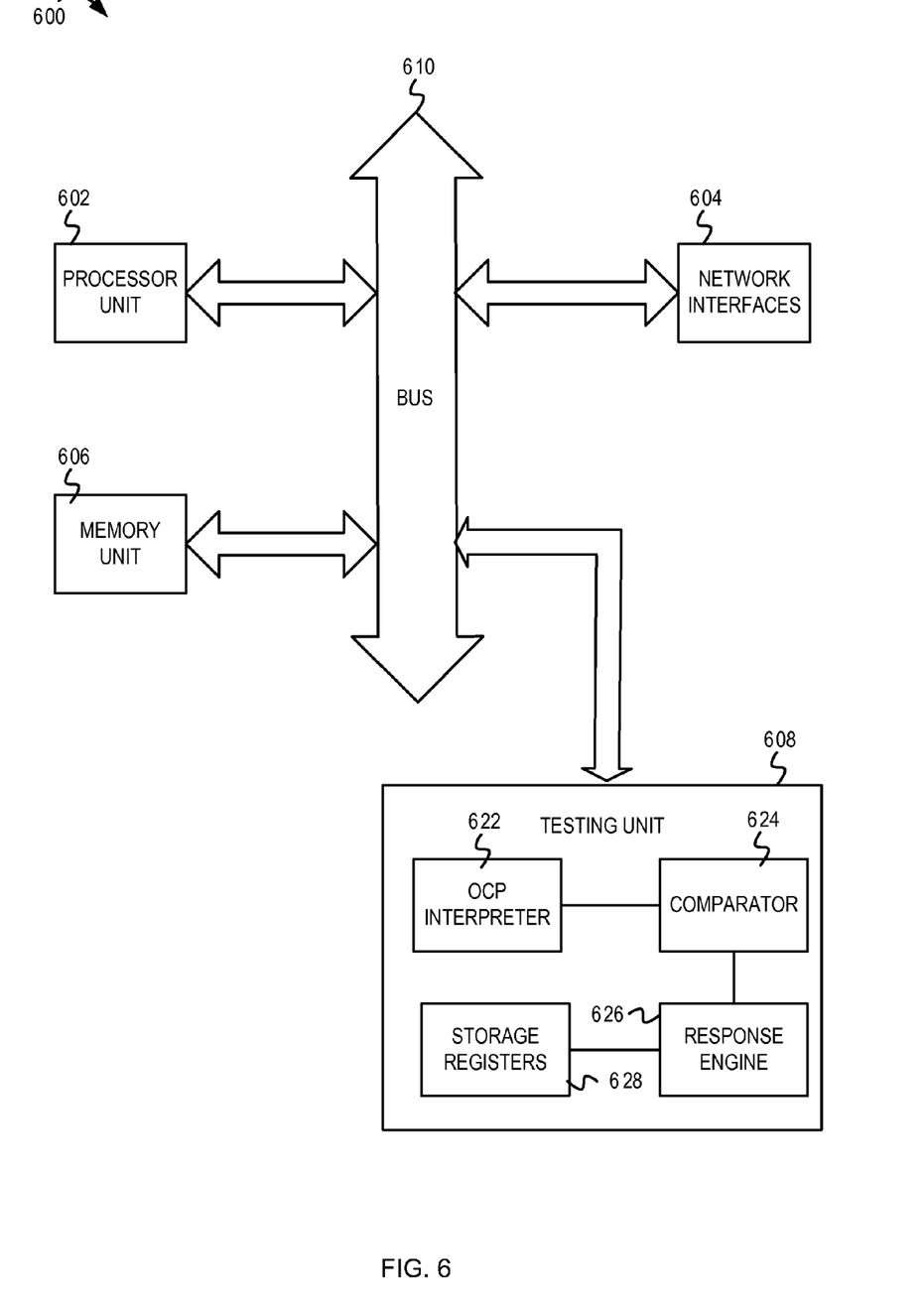
FIG. 6 is a block diagram of one embodiment of an integrated circuit including a mechanism for hardware-based functional testing of integrated circuits.

FIG. 6 is a block diagram of one embodiment of an integrated circuit 600 including a mechanism for hardware-based functional testing of integrated circuits. In some implementations, the integrated circuit 600 may be part of any suitable electronic device, such as a laptop, a netbook, a mobile phone, a personal digital assistant (PDA), or other suitable electronic systems, etc. The integrated circuit 600 may be an application specific integrated circuit (ASIC), a system on a chip (SoC), etc. As depicted by FIG. 6, the integrated circuit 600 includes a processor unit 602 (possibly including multiple processors, multiple cores, multiple nodes, and/or implementing multi-threading, etc.). The processor unit 602 may be an embedded processor (e.g. an embedded microprocessor, an embedded microcontroller, etc.). The integrated circuit 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The integrated circuit 600 also includes a bus 610 (e.g., PCI, ISA, PCI-Express, HyperTransport®, InfiniBand®, NuBus, AHB, AXI, etc.), and network interfaces 604 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface, a SATA interface, a UART interface, etc.)

The integrated circuit 600 also includes a testing unit 608. The testing unit 608 comprises an OCP interpreter 622, a comparator 624, a response engine 626, and storage registers 628. The testing unit 608 can implement functionality to test the validity of cache memories associated with the processor unit 602, test the validity of communication interfaces of the integrated circuit 600, test the validity of interactions between the communication interfaces and other control units (e.g., a memory controller), etc., as described above with reference to FIGS. 1-5. Additionally, the integrated circuit 600 can also comprise one or more CRC engines for testing the integrity of data exchanged between one or more components of the integrated circuit 600 (e.g., between the communication interface and the memory controller), as described with reference to FIG. 1.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, a memory controller, etc.). The processor unit 602, the memory unit 606, and the network interfaces 606 are coupled to the bus 610. Although illustrated as being coupled to the bus 610, the memory unit 606 may be coupled to the processor unit 602 via the memory controller.

While the embodiments are described with reference to various implementations and exploitations, it will be understood that these embodiments are illustrative and that the scope of the inventive subject matter is not limited to them. In general, an integrated functional testing mechanism for integrated circuits as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for functional testing of an integrated circuit, the method comprising:
   determining, at a testing unit of the integrated circuit, to test an instruction cache (I-cache) memory associated with a processor of the integrated circuit;
   determining at the testing unit, a plurality of instructions to be executed by the processor for testing the I-cache memory associated with the processor;
   for each of the plurality of instructions to be executed by the processor for testing the I-cache memory associated with the processor,
      receiving, at the testing unit, a memory address associated with the instruction from the processor, wherein the memory address is generated by the processor in response to executing the instruction;
      determining, at the testing unit, an expected memory address associated with the instruction of the plurality of instructions associated with testing the I-cache memory, wherein the expected memory address indicates a memory location at which the next of the plurality of instructions is stored;
      determining whether the memory address generated by the processor matches the expected memory address associated with the instruction;
      providing, from the testing unit, an indication of a next of the plurality of instructions for execution by the processor in response to determining that the memory address generated by the processor matches the expected memory address associated with the instruction; and generating, at the testing unit, an error notification in response to determining that the memory address generated by the processor does not match the expected memory address associated with the instruction.

2. The method of claim 1, further comprising:
initializing the I-cache memory and providing an indication of the plurality of instructions to be executed by the processor for testing the I-cache memory associated with the processor.

3. The method of claim 1, wherein
the memory address generated by the processor in response to executing the instruction indicates a memory location from which to fetch a next of the plurality of instructions to be executed.

4. The method of claim 1, further comprising:
determining whether additional instructions of the plurality of instructions are to be analyzed, in response to determining that the memory address generated based on the processor executing the instruction matches the expected memory address associated with the instruction; and in response to determining that the additional instructions of the plurality of instructions are to be analyzed,
determining an indication of the next of the plurality of instructions;
said providing, to the processor, the indication of the next of the plurality of instructions; and
storing the indication of the next of the plurality of instructions in the I-cache memory.

5. The method of claim 1, wherein in response to determining that the memory address generated based on the processor executing the instruction does not match the expected memory address associated with the instruction, the method further comprises:
said generating the error notification; and
causing the processor to stop executing remainder of the plurality of instructions associated with testing the I-cache memory.

6. The method of claim 4, wherein said providing the indication of the next of the plurality of instructions further comprises:
incrementing a cache miss count value corresponding to the plurality of instructions associated with testing the I-cache memory, wherein the cache miss count value indicates at least a subset of the plurality of instructions for which the indication of the next of the plurality of instructions was not available in the I-cache memory.

7. The method of claim 6, wherein in response to determining that the additional instructions of the plurality of instructions should not be analyzed, the method further comprises:
determining the cache miss count value associated with the plurality of instructions;
causing the processor to re-execute the plurality of instructions associated with testing the I-cache memory based on the indication of the next of the plurality of instructions corresponding to each of the plurality of instructions associated with testing the I-cache memory;
determining a cache hit count value associated with the plurality of instructions, wherein the cache hit count value indicates at least a subset of the plurality of instructions for which the indication of the next of the plurality of instructions was available in the I-cache memory;

determining whether the cache miss count value matches the cache hit count value;
generating a notification indicating validity of the I-cache memory associated with the processor, in response to determining that the cache miss count value matches the cache hit count value; and
generating the error notification in response to determining that the cache miss count value does not match the cache hit count value.

8. A method for functional testing of an integrated circuit, the method comprising:
determining, at a testing unit of the integrated circuit, to test a data cache (D-cache) memory associated with a processor of the integrated circuit;
for each of a plurality of instructions to be executed by the processor for testing the D-cache memory associated with the processor,
receiving, from the processor, a memory address associated with the instruction from the processor, wherein the memory address is generated by the processor in response to executing the instruction;
determining, at the testing unit, an expected memory address associated with the instruction of the plurality of instructions associated with testing the D-cache memory, wherein the expected memory address indicates a memory location at which data corresponding to the instruction is stored;
in response to determining that the memory address generated by the processor matches the expected memory address associated with the instruction,
accessing, from a set of storage registers associated with the testing unit, the data corresponding to the instruction;
providing, to the processor, the data corresponding to the instruction;
storing the data corresponding to the instruction in the D-cache memory;
incrementing an error counter in response to determining that the memory address generated by the processor does not match the expected memory address associated with the instruction.

9. The method of claim 8, wherein the plurality of instructions associated with testing the D-cache memory comprise modifying one or more data values stored in the D-cache memory and causing the processor to write the modified one or more data values from the D-cache memory to a storage device.

10. The method of claim 8, further comprising:
receiving, from the processor, a data value associated with the instruction from the D-cache memory;
determining an expected data value associated with the instruction, wherein the expected data value indicates data expected to be generated in response to executing the instruction;
determining whether the data value associated with the instruction matches the expected data value;
incrementing the error counter in response to determining that the data value associated with the instruction does not match the expected data value; and
providing, to the processor, an indication of a next of the plurality of instructions associated with testing the D-cache memory in response to determining that the data value associated with the instruction matches the expected data value.

11. The method of claim 8, further comprising:
determining whether additional instructions of the plurality of instructions associated with testing the D cache memory are to be analyzed;
determining whether the error counter is greater than zero in response to determining that the additional instructions of the plurality of instructions associated with testing the D cache memory should not be analyzed;
generating a notification indicating validity of the D-cache memory associated with the processor, in response to determining that the error counter is not greater than zero; and
generating the error notification in response to determining that the error counter is greater than zero.

12. The method of claim 8, further comprising providing, to the processor, an indication of a next of the plurality of instructions associated with testing the D-cache memory.

13. An integrated circuit comprising:
a processor operable to execute a plurality of instructions for testing an instruction cache O-cache) memory associated with the processor;
a testing unit coupled to the processor, the testing unit operable to:
determine to test the I-cache memory associated with the processor of the integrated circuit;
determine the plurality of instructions to be executed by the processor for testing the I-cache memory associated with the processor;
for each of the plurality of instructions to be executed by the processor for testing the I-cache memory associated with the processor, the testing unit is further operable to:
receive, from the processor, a memory address associated with the instruction, wherein the memory address is generated by the processor in response to executing the instruction;
determine an expected memory address associated with the instruction of the plurality of instructions associated with testing the I-cache memory, wherein the expected memory address indicates a memory location at which the next of the plurality of instructions is stored;
determine whether the memory address generated by the processor matches expected memory address associated with the instruction;
provide an indication of a next of the plurality of instructions for execution by the processor in response to the testing unit determining that the memory address generated by the processor matches the expected memory address associated with the instruction; and
generate an error notification in response to the testing unit determining that the memory address generated by the processor does not match the expected memory address associated with the instruction.

14. The integrated circuit of claim 13,
wherein the memory address generated by the processor in response to executing the instruction indicates a memory location from which to fetch a next of the plurality of instructions to be executed, and
wherein testing unit is operable to:
determine whether additional instructions of the plurality of instructions are to be analyzed, in response to the testing unit determining that the memory address generated by the processor matches the expected memory address associated with the instruction; and
in response to the testing unit determining that the additional instructions of the plurality of instructions are to be analyzed,
determine an indication of the next of the plurality of instructions;
provide, to the processor, the indication of the next of the plurality of instructions; and
store the indication of the next of the plurality of instructions in the I-cache memory.

15. The integrated circuit of claim 14, wherein the testing unit operable to provide the indication of the next of the plurality of instructions further comprises the testing unit operable to:
increment a cache miss count value corresponding to the plurality of instructions associated with testing the I-cache memory, wherein the cache miss count value indicates at least a subset of the plurality of instructions for which the indication of the next of the plurality of instructions was not available in the I-cache memory.

16. The integrated circuit of claim 15, wherein in response to the testing unit determining that the additional instructions of the plurality of instructions should not be analyzed, the testing unit is further operable to:
determine the cache miss count value associated with the plurality of instructions;
cause the processor to re-execute the plurality of instructions associated with testing the I-cache memory based on the indication of the next of the plurality of instructions corresponding to each of the plurality of instructions associated with testing the I-cache memory;
determine a cache hit count value associated with the plurality of instructions, wherein the cache hit count value indicates at least a subset of the plurality of instructions for which the indication of the next of the plurality of instructions was available in the I-cache memory;
determine whether the cache miss count value matches the cache hit count value;
generate a notification indicating validity of the I-cache memory associated with the processor, in response to the testing unit determining that the cache miss count value matches the cache hit count value; and
generate the error notification in response to the testing unit determining that the cache miss count value does not match the cache hit count value.

17. The integrated circuit of claim 13, wherein in response to the testing unit generating the error notification, the testing unit is further operable to:
cause the processor to stop executing remainder of the plurality of instructions associated with testing the I-cache memory.

18. An integrated circuit comprising:
a processor operable to execute a plurality of instructions for testing a data cache (D-cache) memory associated with the processor;
a testing unit coupled to the processor, the testing unit operable to:
determine to test the D-cache memory associated with the processor of the integrated circuit;
for each of a plurality of instructions to be executed by the processor for testing the D-cache memory associated with the processor, the testing unit is further operable to:
receive, from the processor, a memory address associated with the instruction, wherein the memory address is generated by the processor in response to executing the instruction;
determine an expected memory address associated with the instruction of the plurality of instructions associated with testing the D-cache memory, wherein the expected memory address indicates a memory location at which data corresponding to the instruction is stored;

in response to the testing unit determining that the memory address generated by the processor matches the expected memory address associated with the instruction, access the data corresponding to the instruction from a set of storage registers associated with the testing unit; provide, to the processor, the data corresponding to the instruction;

store the data corresponding to the instruction in the D-cache memory;

increment an error counter in response to the testing unit determining that the memory address generated by the processor does not match the expected memory address associated with the instruction.

19. The integrated circuit of claim 11, wherein the testing unit is further operable to:

receive, from the processor, a data value associated with the instruction from the D-cache memory;

determine an expected data value associated with the instruction, wherein the expected data value indicates data expected to be generated in response to executing the instruction;

determine whether the data value associated with the instruction matches the expected data value;

increment the error counter in response to the testing unit determining that the data value associated with the instruction does not match the expected data value; and provide, to the processor, an indication of a next of the plurality of instructions associated with testing the D-cache memory in response to the testing unit determining that the data value associated with the instruction matches the expected data value.

20. The integrated circuit of claim 19, wherein the testing unit is further operable to:

determine whether additional instructions of the plurality of instructions associated with testing the D cache memory are to be analyzed;

determine whether the error counter is greater than zero in response to the testing unit determining that the additional instructions of the plurality of instructions associated with testing the D cache memory should not be analyzed;

generate a notification indicating validity of the D-cache memory associated with the processor, in response to the testing unit determining that the error counter is not greater than zero; and generate the error notification in response to the testing unit determining that the error counter is greater than zero.

21. One or more machine-readable storage media, having instructions stored therein, which when executed by one or more processors causes the one or more processors to perform operations that comprise:

determining, at a testing unit of an integrated circuit, to test an instruction cache (I-cache) associated with a processor of the integrated circuit;

determining a plurality of instructions to be executed by the processor for testing the I-cache memory associated with the processor;

for each of the plurality of instructions to be executed by the processor for testing the I-cache memory associated with the processor, receiving a memory address associated with the instruction from the processor, wherein the memory address is generated by the processor in response to executing the instruction;

determining an expected memory address associated with the instruction of the plurality of instructions associated with testing the I-cache memory, wherein the expected memory address indicates a memory location at which the next of the plurality of instructions is stored;

determining whether the memory address generated by the processor matches the expected memory address associated with the instruction;

providing an indication of a next of the plurality of instructions for execution by the processor in response to determining that the memory address generated by the processor matches the expected memory address associated with the instruction; and generating an error notification in response to determining that the memory address generated by the processor does not match the expected memory address associated with the instruction.

22. The machine-readable storage media of claim 21, wherein the memory address generated by the processor in response to executing the instruction indicates a memory location from which to fetch a next of the plurality of instructions to be executed, and wherein the operations further comprise:

determining whether the memory address generated based on the processor executing the instruction matches the expected memory address associated with the instruction;

determining whether additional instructions of the plurality of instructions are to be analyzed, in response to determining that the memory address generated based on the processor executing the instruction matches the expected memory address associated with the instruction; and in response to determining that the additional instructions of the plurality of instructions are to be analyzed, determining an indication of the next of the plurality of instructions;

said providing, to the processor, the indication of the next of the plurality of instructions; and storing the indication of the next of the plurality of instructions in the I-cache memory.

23. The machine-readable storage media of claim 21, wherein said operation of providing the indication of the next of the plurality of instructions further comprises:

incrementing a cache miss count value corresponding to the plurality of instructions associated with testing the I-cache memory, wherein the cache miss count value indicates at least a subset of the plurality of instructions for which the indication of the next of the plurality of instructions was not available in the I-cache memory.

24. The machine-readable storage media of claim 23, wherein in response to determining that the additional instructions of the plurality of instructions should not be analyzed, the operations further comprise:

determining the cache miss count value associated with the plurality of instructions;

causing the processor to re-execute the plurality of instructions associated with testing the I-cache memory based on the indication of the next of the plurality of instructions corresponding to each of the plurality of instructions associated with testing the I-cache memory;

determining a cache hit count value associated with the plurality of instructions, wherein the cache hit count value indicates at least a subset of the plurality of instructions for which the indication of the next of the plurality of instructions was available in the I-cache memory;

determining whether the cache miss count value matches the cache hit count value;

generating a notification indicating validity of the I-cache memory associated with the processor, in response to determining that the cache miss count value matches the cache hit count value; and generating the error notification in response to determining that the cache miss count value does not match the cache hit count value.

25. The machine-readable storage media of claim 21, wherein in response to said operation of generating the error notification, the operations further comprise:

cause the processor to stop executing remainder of the plurality of instructions associated with testing the I-cache memory.

26. One or more machine-readable storage media, having instructions stored therein, which when executed by one or more processors causes the one or more processors to perform operations that comprise:

determining, at a testing unit of the integrated circuit, to test a data cache (D-cache) memory associated with a processor of the integrated circuit;

for each of a plurality of instructions to be executed by the processor for testing the D-cache memory associated with the processor, receiving, from the processor, a memory address associated with the instruction from the processor, wherein the memory address is generated by the processor in response to executing the instruction;

determining an expected memory address associated with the instruction of the plurality of instructions associated with testing the D-cache memory, wherein the expected memory address indicates a memory location at which data corresponding to the instruction is stored;

in response to determining that the memory address generated by the processor matches the expected memory address associated with the instruction, accessing the data corresponding to the instruction from a set of storage registers associated with the testing unit;

providing, to the processor, the data corresponding to the instruction;

storing the data corresponding to the instruction in the D-cache memory;

incrementing an error counter in response to determining that the memory address generated by the processor does not match the expected memory address associated with the instruction.

27. The machine-readable storage media of claim 26, wherein the operations further comprise:

receiving, from the processor, a data value associated with the instruction from the D-cache memory;

determining an expected data value associated with the instruction, wherein the expected data value indicates data expected to be generated in response to executing the instruction;

determining whether the data value associated with the instruction matches the expected data value;

incrementing the error counter in response to determining that the data value associated with the instruction does not match the expected data value; and providing, to the processor, an indication of a next of the plurality of instructions associated with testing the D-cache memory in response to determining that the data value associated with the instruction matches the expected data value.

* * * * *